July 6, 1943.  E. A. MILHAUPT  2,323,406
BRAKING SYSTEM
Filed April 17, 1941

INVENTOR
EDGAR A. MILHAUPT
BY
Wheeler, Wheeler & Wheeler
ATTORNEYS

Patented July 6, 1943

2,323,406

UNITED STATES PATENT OFFICE 2,323,406

BRAKING SYSTEM

Edgar A. Milhaupt, Appleton, Wis.

Application April 17, 1941, Serial No. 388,966

20 Claims. (Cl. 188—152)

This invention relates to improvements in braking systems and especially to improvements in hydraulic braking systems of the type employed on vehicles.

It is known to provide braking systems of the type having multiple brake units with means for rendering some of the units inoperative when hydraulic pressure within the system rises to a predetermined level. Systems of this type are employed, for example, on heavy vehicles of the tractor-trailer type where the brakes of the front tractor unit operate simultaneously with the rear brakes of the trailer and those of the tractor when a moderate degree of braking is employed, but when high brake pressures are employed, as when the foot pedal is fully depressed, the front wheel tractor brakes are automatically cut out at a predetermined pressure to prevent further braking action thereon and to throw all increases in braking load caused by higher pressures on the rear tractor and trailer brakes. While this braking arrangement is desirable under normal circumstances, systems of this type usually employ a vacuum operated booster brake, and when the vehicle motor stops with the result that the booster brake ceases to function, it is desirable that all of the brake units function at all pressures to provide maximum braking during the emergency regardless of the hydraulic pressure within the system.

It is, therefore, an important object of the invention to provide a braking system of the type described above with means (controlled by cessation of a normal engine function) for preventing cut-out of any of the brake units when the engine ceases to operate.

Another object of the invention resides in the provision of means for connecting all brake units of a multiple unit vacuum controlled booster brake system upon failure of the booster brake vacuum regardless of the hydraulic pressure level within the system and even though some of the units are disconnected at the time of the vacuum failure.

A further object is to provide improvements in an engine-regulated valve adapted for use with hydraulic brake systems as above described.

A still further object is to generally improve and simplify the operation of hydraulic braking systems for one or more of the reasons above stated with special reference to brake systems employed on motor vehicles.

In the drawing.

Like parts are designated by the same reference numerals throughout the drawing and description.

Figure 1:
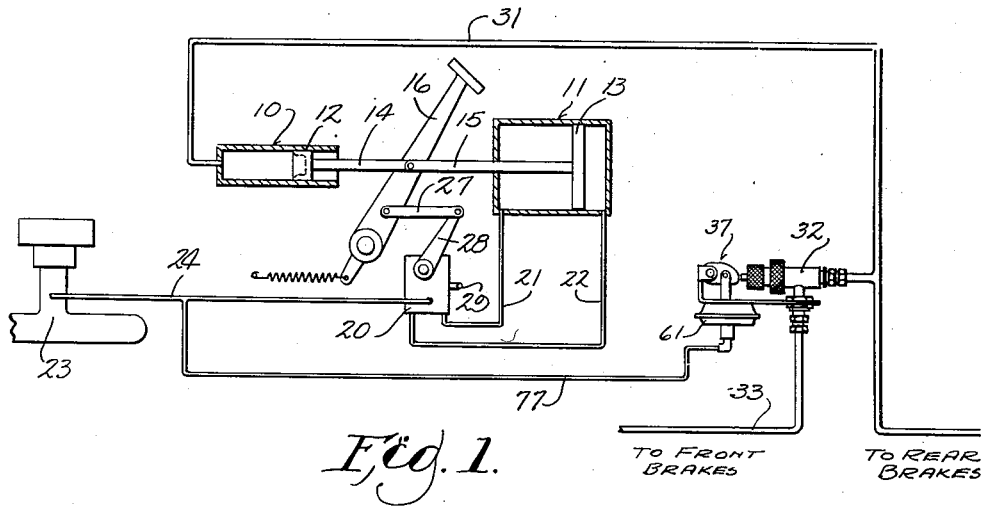
Figure 1 shows diagrammatically a braking system of the booster brake type and having a vacuum actuated valve mechanism incorporated therein.

Figure 1 discloses diagrammatically a braking system (which is one of many possible systems in which the invention is useful) including a master cylinder 10 and a booster cylinder 11 having pistons 12 and 13 respectively, connected by rods 14 and 15 to pedal 16 for simultaneous movement in their respective cylinders. A conventional three-way valve device 20 is connected to opposite ends of cylinder 11 through conduits 21 and 22 for the control of the booster piston 13 by atmospheric pressure and by vacuum communicated from manifold 23 through conduit 24 which leads into valve device 20. Device 20 is actuated by lever 16 through link arms 27 and 28 whereby to apply a vacuum to the cylinder 11 through conduit 21 during depression of lever 16 and through conduit 22 during retraction thereof whereby to aid an operator in the actuation of the lever. Device 20 operates to connect the end of cylinder 11 not under vacuum for communication with the atmosphere through a vent 29.

Master cylinder 10 is connected in the usual manner through conduit 31 to all brake units, not shown, said conduit leading directly to the rear brakes and through valve device 32 and branch conduit 33 to the front set of brakes. A suitable liquid is provided in the closed circuit comprising cylinder 10, conduits 31 and 33 and the brake units, the liquid being subjected to varying pressures dependent upon the position of piston 12 in cylinder 10.

Figure 2:
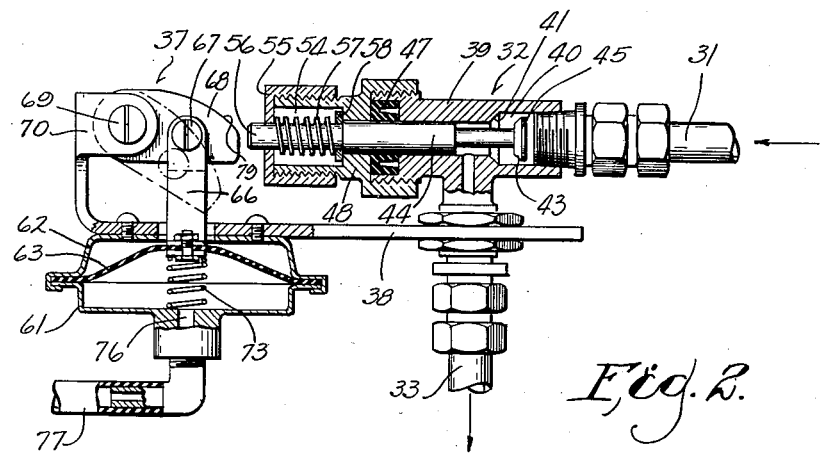
Figure 2 is a view in longitudinal section of the vacuum actuated valve mechanism shown in Figure 1.
Figure 3:
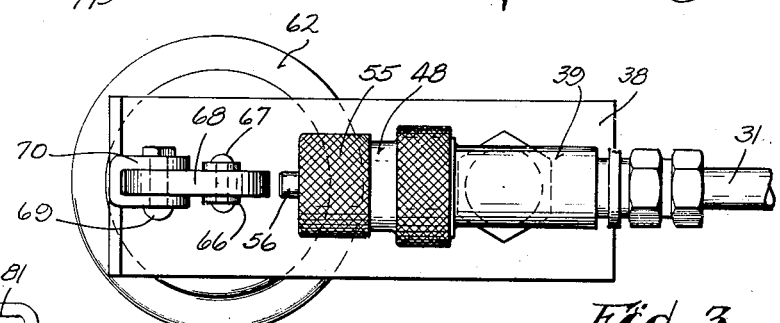
Figure 3 is a top plan view of the valve mechanism shown in Figure 2.

As best shown in Figure 2, valve device 32 and (in accordance with the present invention) an associated control unit 37 for limiting the action of the valve device are mounted in longitudinal alignment on bracket 38. Device 32 includes a housing section 39 provided with a valve chamber 40 in which a valve seat 41 is disposed intermediate inlet and outlet passages to which conduits 31 and 33 respectively are connected.

A poppet valve 43 controls the flow of liquid from conduit 31 to conduit 33 and has a stem portion 44 slidably journaled in the housing for the engagement of valve head 45 with seat 41. Housing section 39 is provided in the end thereof opposite inlet 31 with a channel encircling stem portion 44 in which annularly grooved rubber packing 47 is disposed. A second housing section 48 threadedly engages section 39 to provide an extension thereof, said packing 47 being maintained compressed between the sections whereby to provide a fluid-tight seal about the valve stem bearing 44.

Housing section 48 is provided with a spring chamber 54 having its outer end closed by a cap 55 through which the reduced valve stem terminus 56 projects. A spring 57 is maintained under compression between cap 55 and a washer 58 which abuts the shoulder intermediate stem portions 56 and 44 to bias the valve toward an open position as shown, in which position liquid may flow from conduit 31 to conduit 33 for actuation of the front brake. Spring 57 is of sufficient tension to allow a predetermined amount of braking action of the front wheel units before the fluid pressure reaches an amount sufficient to close valve 43. All pressure increases above the valve closing pressure will affect only those brake units not connected through conduit 33. Hence the entire increase in braking load above the predetermined pressure is normally applied to the rear tractor braking units and to the trailer braking units (if any).

The function of vacuum cup control device 37 is to permit the closing of valve 43 when the motor is running and when high pressures are built up in the fluid system and to prevent valve closing when the motor stops. Device 37 includes a housing having a lower section 61 and an upper section 62 between which a diaphragm 63 is clamped. Diaphragm 63 carries a centrally mounted link 66 extending upwardly through suitable apertures in the casing section 62 and the bracket 38 for pivotal connection at 67 with a cam lever 68 which is pivotally mounted at 69 on an upstanding portion 70 of bracket 38. Diaphragm 63 is biased by a spring 73 maintained under compression between the diaphragm and the casing, to maintain cam lever 68 in the position shown in full lines, Figure 2, when the diaphragm is not subjected to a vacuum. In this position of lever 68, movement of valve 43 is restricted to prevent its seating regardless of the magnitude of liquid pressure against the valve head. Casing section 61 is provided with a port 76 from which a conduit 77 leads to the motor manifold 23 for the supply of vacuum to device 37 during operation of the vehicle motor.

During periods of motor operation, sufficient vacuum is built up within device 37 to draw diaphragm 63 downwardly and lever 68 into the position shown by dotted lines, Figure 2, and out of the path of movement of valve 43. Hence, during such periods of motor operation a pressure within the fluid system sufficient to compress spring 57 will seat valve 43 against the pressure of spring 57 whereby to prevent liquid pressure transfer through the conduit 33 to the front brakes.

When the motor stops, spring 73 returns lever 68 to the full line position, said spring being of sufficient tension to force valve 43 from a closed to an open position by cam action between lever surface 79 and the stem terminus 56 against the liquid pressure exerted on valve head 45, in the event that the valve is then closed. When valve 43 is open when the motor stops, lever 68 merely moves into the full line position to prohibit the valve from closing until the motor is again started.

The device as disclosed automatically functions to prevent cut-out of any brake units upon failure of the motor and the consequent failure of the booster brake system necessarily accompanying such motor failure. Further, any brake units which are cut out at the time of motor failure are automatically re-connected upon such motor failure to provide an operator with maximum braking area to partially compensate for loss of the booster brake aid. I believe that the use of engine-induced vacuum is the simplest way of making the control lever 68 dependent upon continued functioning of the engine. However, it will be obvious to those skilled in the art that any other engine function may be utilized to determine the position of the control lever 68 and this is exemplified by two additional control systems applicable to such lever as suggested in Figure 4 and Figure 5.

Figure 4:
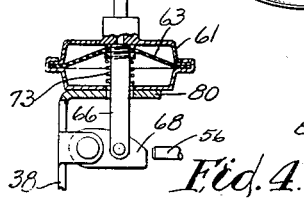
Figure 4 and Figure 5 are fragmentary details similar to Figure 2 showing modified embodiments.

In Figure 4, the diaphragm chamber corresponds in all respects to the device of Figure 2 with the exception that it is inverted and mounted upon an extension 80 of the bracket 38. The arrangement is such that the diaphragm is operated by pressure rather than vacuum. A pipe 81 connects housing portion 61 of the diaphragm chamber to the oil pump of the engine. When the engine stops and the oil pump is at rest the cam lever 68 will be raised to the position illustrated in which it will block valve stem 56 to preclude the opening of the valve. However, when the engine is in operation, the oil pressure communicated through line 81 from the pump will act against the diaphragm 63 to move the cam lever 68 against the compression of spring 73 to the inoperative position in which the cam lever is illustrated in dotted lines in Figure 2, whereupon the differential pressure valve 45 in the hydraulic brake system can seat in the normal manner.

Figure 5:
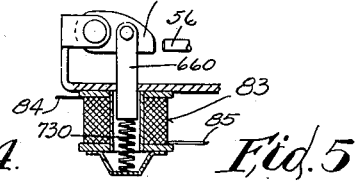

Figure 5 shows an arrangement in which the control is electrical. The link 660 connected with the cam lever 68 comprises the armature of a solenoid 83 having a connection 84 to the engine generator and connection 85 to the battery of the vehicle. So long as the engine is in operation, the solenoid will be energized to draw the armature 660 downwardly against the compression of spring 730, thereby retracting cam lever 68 from the path of valve stem portion 56 to allow the pressure differential valve 45 to seat in the customary manner. However, as soon as the engine ceases to operate, thereby creating an emergency, the solenoid will be deenergized and spring 730 will thrust the cam lever 68 into operative position, obstructing valve stem 56 and thereby precluding the closing of the valve, if it is open, or opening it, if it has previously been closed. The arrangements disclosed are typical of numerous ways in which engine functions may be utilized to permit the normal operation of the pressure differential valve 45 so long as the engine continues to operate normally, but will hold valve 45 open when the engine crank shaft is at rest, thereby failing to actuate the booster system and an emergency thereby created.

While the braking system herein shown to exemplify the invention has been designated as a hydraulic or liquid pressure system, the invention can be applied to braking systems generally, and therefore I do not limit its application to any particular type of braking system.

I claim:

1. In a vehicle having fluid pressure brakes and an engine, a device operable in an emergency for preventing the seating of a pressure differential valve in said fluid pressure braking system, said device comprising the combination with a part connected with the valve to move therewith, of a limiting means co-acting with said part in a direction to preclude valve seating, said limiting means being movable to and from a position for engagement with said part, and a member having means operatively connected to be controlled in accordance with engine operation for actuating said limiting means in at least one of its directions of movement.

2. In a vehicle having a fluid pressure brake line and an engine having means performing an engine function during engine operation, and discontinuing said function upon cessation of engine operation the combination with a pressure differential valve mechanism controlling communication between said fluid pressure brake line and a fluid pressure brake branch line, of a part connected with said valve to partake of the movement thereof, a member movable to and from a position for engagement with said part and adapted in said position to preclude the seating of said valve, means operable in accordance with said engine function and thereby dependent upon engine operation for actuating said member from said position, and means for actuating said member to said position upon the cessation of such function.

3. In a vehicle having a hydraulic brake line and an engine provided with means for the performance of an engine function during engine operation, the combination with a pressure differential valve mechanism adapted for connection between said hydraulic brake line and a branch line, said mechanism including a casing provided with a valve seat affording communication of the branch line with said hydraulic brake line, and a valve movable to and from the seat, said valve being biased away from its seat, of a part connected with the valve to partake of the movement thereof, a member movable to and from a position in which it is engageable by said part to preclude the seating of said valve, said member being biased for movement toward said position, and actuating mechanism for said member comprising means operatively connected to be actuated in accordance with said engine function and operatively connected to said member for the actuation thereof from said position against said bias only when said engine is operating.

4. A fluid pressure braking system including a vacuum actuating booster, a vacuum creating device, multiple brake units, means for limiting the amount of fluid pressure applied to some of the units while the vacuum creating device is functioning, and means responsive to the actuation of said vacuum creating device and associated with the pressure limiting means to allow unlimited fluid pressure to be transmitted to all the brake units when said vacuum creating device fails to supply sufficient vacuum to the booster for the actuation thereof.

5. In a braking system including multiple brake units operated by fluid pressure from a master cylinder and having a vacuum operated booster mechanism to aid an operator in building up fluid pressure in said master cylinder, vacuum creating means for the actuation of said booster, means for limiting the amount of fluid pressure transmitted to some of the units while said vacuum creating device is functioning, and means cooperating with said pressure limiting means whereby to permit unlimited fluid pressure transmission to all of the units upon the failure of said vacuum creating device to produce sufficient vacuum to actuate said booster.

6. A fluid braking system including a vacuum controlled booster device, multiple brake units, means for the supply of vacuum for the actuation of said booster, means controllable by an operator for building up fluid pressure within the system, and means for cutting off hydraulic pressure to some of the units after a predetermined amount has been transmitted thereto, and means for preventing said cutting off of some of the units upon the failure of said vacuum supply.

7. In a fluid pressure braking system, a pressure producing device controllable by an operator, multiple brake units, and means for transmitting pressure from the pressure producing device to the units, a source of power, a booster mechanism associated with the pressure producing device to aid operator control thereof, means connecting said mechanism to said source of power for the actuation of the mechanism, valve means intermediate the pressure producing device and some of the brake units for limiting the amount of pressure transmitted thereto during actuation of the booster mechanism, and means operatively connecting the valve means and the source of power for preventing said pressure limiting means from functioning during periods of power failure.

8. A vacuum controlled valve mechanism comprising means for passage of fluid through said mechanism, a valve to control the passage of fluid therethrough, spring means urging the valve toward an open position against the fluid flow therethrough and means movable from a position obstructing the closing of said valve against the pressure of said spring to a position allowing valve closing, said movable means being provided and connected with a remote source of power connected thereto.

9. In a braking system of the type described including multiple brake units operated by fluid pressure from a master cylinder, the combination with a booster mechanism associated with the master cylinder, and a motor for the supply of vacuum to the booster, a valve between the master cylinder and at least one of the units and operative by pressure within the system for limiting the amount of fluid pressure transmitted to said unit, of a pivoted lever, means associated therewith for maintaining the lever in a position whereby to allow said valve to close while said vacuum supplying motor operates, and means for actuating the lever to a position to prevent the closure of said valve when the motor stops.

10. A valve control device including a housing having inlet and outlet ports and a valve for the control of fluid therethrough, said valve having a stem portion projecting from a wall of said housing, spring means biasing the valve toward an open position, a pivoted lever exteriorly of said casing and adapted to swing from a position obstructing the valve from closing to a position allowing the valve to close, and a vacuum operable diaphragm connected to said lever for the actuation thereof from a remote source of vacuum.

11. A device as set forth in claim 10 including spring means biasing the diaphragm and said pivoted lever toward a valve obstructing position.

12. A device as set forth in claim 10 wherein said diaphragm is connected to the pivoted lever by a rigid link pivotally engaging the lever at a point spaced from the pivotal mounting thereof.

13. In a device having a fluid pressure brake line and an engine adapted to perform a predetermined function during the engine operation, the combination with a pressure differential valve mechanism controlling communication between said fluid pressure brake line and a fluid pressure brake branch line, of a part connected with said valve to partake of the movement thereof, a member movable to and from a position for engagement with said part and adapted in said position to preclude the seating of said valve, means operable hydraulically in accordance with said engine function for actuating said member from said position, and means for actuating said member to said position upon the cessation of such function whereby the movement of said member from and to said position depends upon engine operation and non-operation respectively.

14. In a device having a fluid pressure brake line and an engine adapted to perform a predetermined function during the engine operation, the combination with a pressure differential valve mechanism controlling communication between said fluid pressure brake line and a fluid pressure brake branch line, of a part connected with said valve to partake of the movement thereof, a member movable to and from a position for engagement with said part and adapted in said position to preclude the seating of said valve, means operable electrically in accordance with said engine function for actuating said member from said position when said engine is operating, and means for actuating said member to said position upon the cessation of such function when said engine ceases operation.

15. In a device having a fluid pressure brake line and an engine adapted to perform a predetermined function during the engine operation, a valve mechanism including means for passage of fluid through the mechanism, a valve positioned to control the passage of fluid therethrough, spring means urging the valve toward an open position against the fluid flow therethrough, and means movable from a position obstructing the closing of said valve against the pressure of the spring to a position allowing valve closing, said movable means being provided with a fluid pressure actuator and means controlling pressure on said actuator in response to the function of said engine remote therefrom whereby said actuator moves said movable means to close said valve during engine operation and said spring opens said valve when said engine ceases to operate.

16. A valve mechanism including means for passage of fluid through the mechanism, a valve positioned to control the passage of fluid therethrough, spring means urging the valve toward an open position against the fluid flow therethrough, means movable from a position obstructing the closing of said valve against the pressure of the spring to a position allowing valve closing, said movable means being provided with an electromagnetic actuator, and an engine having means for energizing said actuator and connected with the engine to operate during engine operation.

17. A device as set forth in claim 15 wherein said movable means include a diaphragm adapted for distortion by hydraulic pressure, a member movable to and from said valve obstructing position, means connecting the diaphragm to the member, and spring means biasing the diaphragm toward the source of hydraulic pressure, whereby hydraulic distortion of the diaphragm moves the member out of valve-obstructing position and said spring means returns the member to valve obstructing position upon the failure of said hydraulic pressure.

18. A device as set forth in claim 16 wherein said movable means include a solenoid adapted for magnetization in accordance with an engine function, an armature operative by said solenoid, a member movable to and from said valve obstructing position and connected to said armature for actuation thereby, and means biasing the member toward said valve obstructing position, whereby during periods of solenoid de-magnetization the biasing means returns the member to valve-obstructing position.

19. The combination with a plurality of brake actuating connections and a brake operator for said connections provided with both power operating means and manual operating means, of a control device controlling motion transmission from said operator through one of said connections, said device including a part movable between a first position in which motion transmission to the connection controlled thereby occurs and a second position in which motion transmission to such connection does not necessarily occur, said part being biased toward said first position, means for actuating said part from said power operating means for moving said part in opposition to said bias toward the second position, said operator being effective upon said plurality of brake actuating connections upon failure of said power operating means and being ineffective upon one of said connections under predetermined conditions including the condition when said power operating means is functioning.

20. The combination with an engine part functioning only during continued engine operation, of a plurality of brake actuating connections, an operator therefor, a control device for one of said connections including an element movable between a first position in which motion is transmitted from said operator through the controlled connection and a second position in which motion is not necessarily transmitted from the operator through the controlled connection, motion being transmitted regardless of said control device to the other brake actuating connection, means biasing said element toward its first position, means for actuating said element from said engine part in opposition to said biasing means when said engine part is functioning during engine operation, and mechanism operable upon said operator and comprising both an engine powered member and a pedal, said engine powered member being pedal controlled and adapted to function only during engine operation, whereby engine failure will result in failure of said element actuating means as well as failure of said engine powered member, both of said connections being thereupon operable for motion transmission from said operator when said engine is not in operation, and one of said connections being not necessarily operable for motion transmission from said operator when engine operation continues.

EDGAR A. MILHAUPT.